United States Patent
Vignon

[11] 4,051,931
[45] Oct. 4, 1977

[54] HYDRODYNAMIC BRAKE

[75] Inventor: Denis Vignon, Friedrichshafen, Germany

[73] Assignee: Zahnradfabrik Friedrichshafen Aktiengesellschaft, Friedrichshafen, Germany

[21] Appl. No.: 694,965

[22] Filed: June 11, 1976

[30] Foreign Application Priority Data

June 14, 1975 Germany .......................... 2526663

[51] Int. Cl.² ............................................ F16D 57/02
[52] U.S. Cl. ..................................... 188/296; 60/330; 60/342
[58] Field of Search ................... 188/290, 296; 60/330, 60/342, 348, 347

[56] References Cited

U.S. PATENT DOCUMENTS

| 1,052,302 | 2/1913 | Armstrong | 188/290 |
| 2,126,751 | 8/1938 | DeLaMater | 188/296 |
| 2,381,682 | 8/1945 | Mayner | 60/342 |

FOREIGN PATENT DOCUMENTS

| 884,744 | 8/1943 | France | 60/347 |
| 578 of | 1910 | United Kingdom | 188/290 |
| 229,578 | 10/1968 | U.S.S.R. | 188/296 |

*Primary Examiner*—Trygve M. Blix
*Assistant Examiner*—Edward R. Kazenske
*Attorney, Agent, or Firm*—Karl F. Ross

[57] ABSTRACT

Two closely juxtaposed coaxial disks, one fixed and the other rotatable, are formed with confronting annular grooves partitioned by slanting vanes into coextensive pockets designed to decelerate the rotation upon the admission of hydraulic fluid into a chamber formed around the rotatable disk by the fixed disk and a brake housing secured thereto. The fixed disk has a limitedly rotatable annular insert which carries at least a part of each stationary vane thereof and can be moved between a working position in which its pockets are mutually isolated and an idling position in which these pockets intercommunicate either directly or through an external space. The annular insert may be urged into the idling position by a set of springs whose force is overcome, upon the production of hydraulic fluid, by the reaction torque exerted upon the stationary vanes.

9 Claims, 10 Drawing Figures

HYDRODYNAMIC BRAKE

FIELD OF THE INVENTION

My present invention relates to a hydrodynamic brake, of the type sometimes referred to as a retarder, in which a rotatable disk rigid with an output shaft confronts a coaxial stationary disk within a toroidal chamber to which hydraulic fluid under pressure may be selectively admitted in order to decelerate the motion of the rotatable disk.

BACKGROUND OF THE INVENTION

The disks of such a hydrodynamic brake are generally provided along their confronting faces with annular grooves which are subdivided, by angularly equispaced vanes flush with the disk faces, into adjoining pockets which are peripherally coextensive on the two disks so that their two sets of vanes are aligned with each other in certain relative angular positions. The retardation of the rotor disk by the entry of hydraulic fluid into the brake chamber converts the kinetic energy, without any wear of the moving parts, into thermal energy which may be dissipated in a heat exchanger; see, for example, U.S. Pat. Nos. 3,423,134 and 3,482,659.

The release of the brake requires the draining of its chamber and should enable virtually unimpeded relative rotation of the disks. In practice, however, a residue of hydraulic fluid (referred to hereinafter, for convenience, as oil) will remain trapped in the pockets and, together with the air volume in the chamber, will resist such relative rotation. Attempts have been made to obviate this drawback by the use of axially movable baffles which in the idling state can be shifted toward the gap between the rotor and stator disks to arrest the retarding air circulation; see, for example, German printed specification No. 1,675,248. Such a construction, requiring a large number of baffles and associated actuating elements, is complicated and correspondingly expensive.

OBJECT OF THE INVENTION

The object of my present invention, therefore, is to provide, in a hydrodynamic brake of the general character described, simple means for substantially eliminating the retardation effect of air or other fluid in the idling state.

SUMMARY OF THE INVENTION

I realize this object, in accordance with my present invention, by splitting one of the two coacting disks into two parts, namely a body and an annular insert centered on the disk axis, this insert being limitedly rotatable about that axis between a first and a second position relative to the disk body. In its first relative position, the insert isolates the pockets of that disk from one another whereby the device will operate in the manner of a conventional retarder; in its second relative position it interconnects these pockets at locations remote from the other disk, thereby letting the entrapped air circulate freely among the pockets of the split disk so as to minimize the reaction of this fluid upon the other disk.

In the embodiments more particularly described hereinafter, each vane of the split disk is wholly or partly integral with the limitedly rotatable insert whereby the pockets of that disk, or portions thereof, are displaceable with reference to the disk body to establish a bypass path for the fluid in the idling state. In that state the interconnected pockets may communicate with one another directly or through an adjoining space which may be a manifold-type annular channel within the disk body but could also be the surrounding atmosphere, especially if the split disk is the stationary one. Although in principle either disk may be split into two relatively movable parts pursuant to my present invention, it will generally be more convenient to choose the stator disk for this purpose.

BRIEF DESCRIPTION OF THE DRAWING

The above and other features of the invention will now be described in detail with reference to the accompanying drawing in which.

SPECIFIC DESCRIPTION

Figure 5:
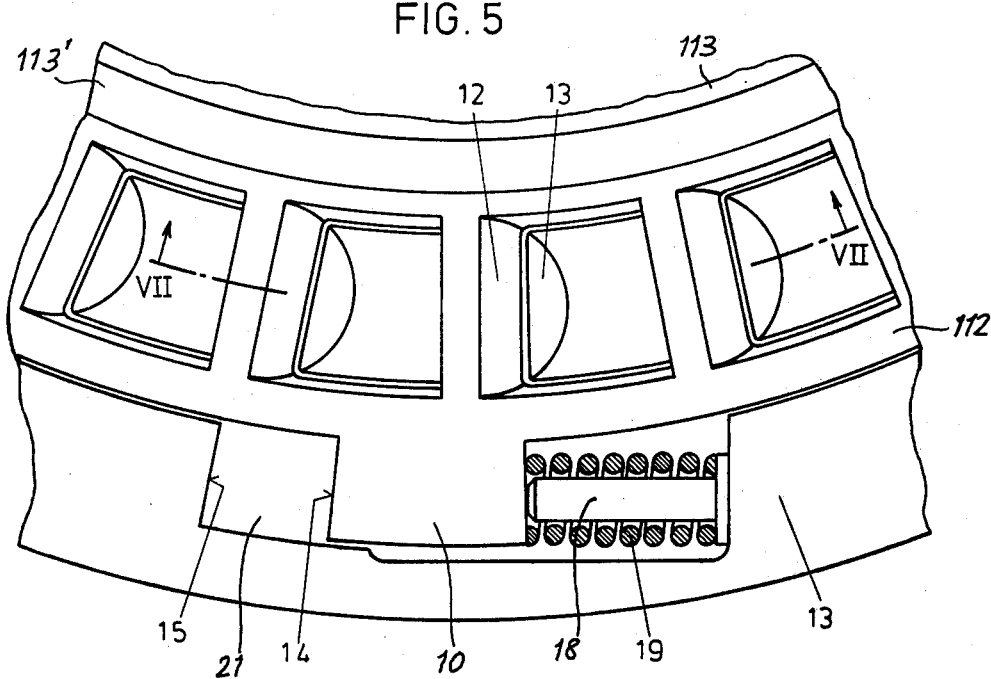
FIG. 5 is a partial face view of a stator disk forming part of the assembly of FIG. 1, as seen on the line V — V of FIG. 1.
Figure 6:
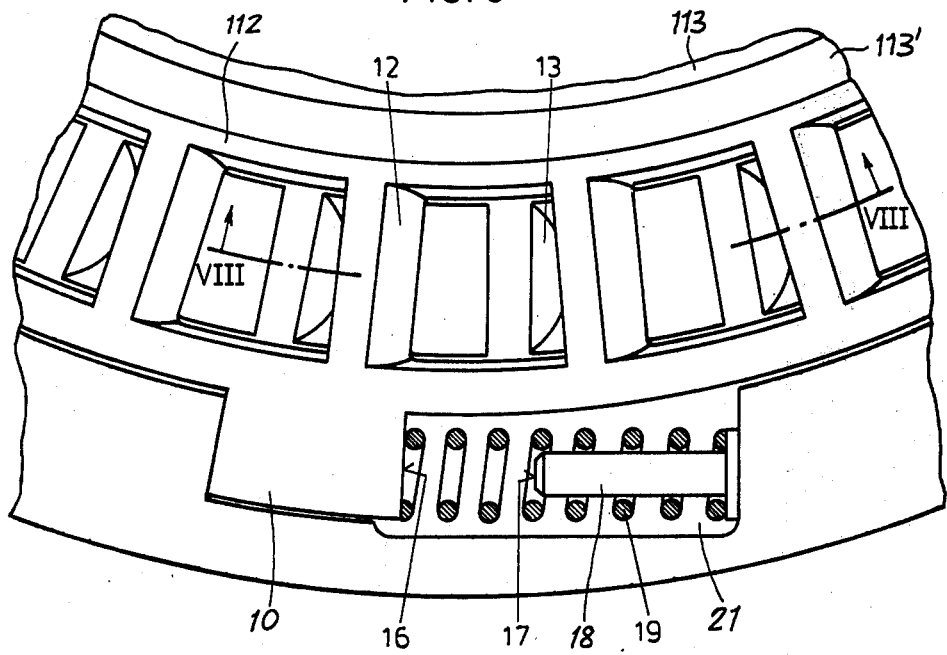
FIG. 6 is a view similar to FIG. 5, showing the assembly in an alternate position.
Figure 7:
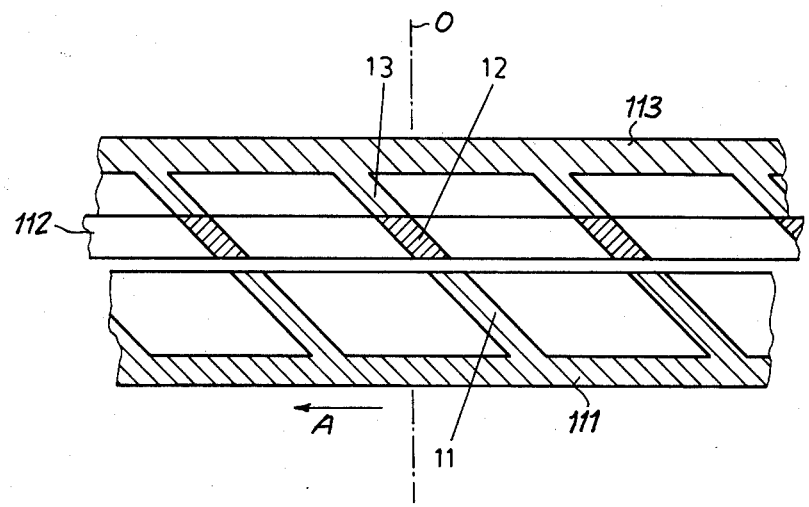
FIG. 7 is a fragmentary sectional view taken on the line VII — VII of FIG. 5.

In FIGS. 1 and 5 - 8 I have shown part of a hydrodynamic brake of the general type described in the two aforementioned U.S. patents. The brake comprises a housing 110 enclosing, together with a two-part stator disk 112, 113, a toroidal chamber 100 wherein a rotor disk 111 is free to turn, on a nonillustrated load shaft journaled in the housing, about an axis O (FIG. 7). Oil under pressure is admitted into and withdrawn from the chamber 100 via a conduit 20, e.g. in the manner described in U.S. Pat. No. 3,423,134; the oil could also be centrifugally pumped into and discharged from the housing by the rotation of disk 111, e.g. as taught in U.S. Pat. No. 3,482,659. The stator disk is split into a body 113, carrying vane portions 13, and an annular insert 112, carrying complementary vane portions 12. Chamber 100 is sealed against the escape of fluid by annular ribs 111' and 111" received in grooves 110' of housing 110 and 113' of disk body 113, respectively.

Figure 8:
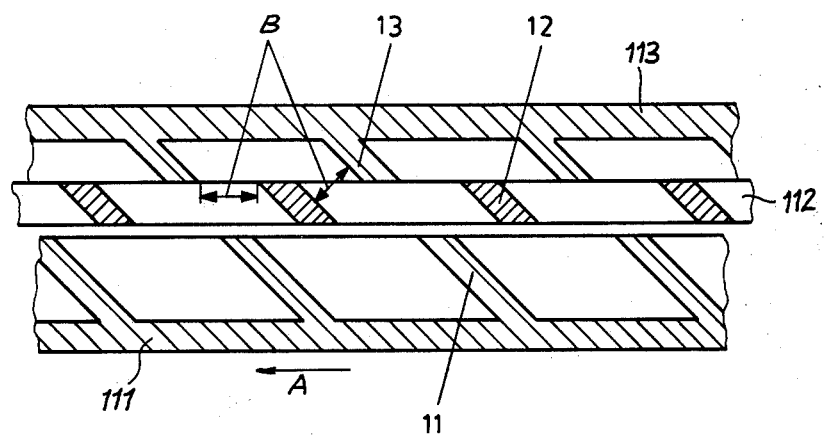
FIG. 8 is a view similar to FIG. 7 but taken on the line VIII — VIII of FIG. 6.

As best seen in FIGS. 7 and 8, the two coaxial and relatively rotatable disks 111 and 112, 113 are provided with confronting and peripherally coextensive pockets which are open toward each other and are bounded by vanes 11 and 12, 13 lying skew to axis O. With disk 111 rotating in the direction indicated by an arrow A, the stationary vanes 12, 13 are pitched in the direction of the oncoming rotating vanes 11. Thus, oil forced into the gap between the two disks fills their pockets and, by the relative movement of the vanes, is set in swirling motion so as to exert a retarding effect upon the rotor disk 111.

In this embodiment the portions 12 of the stationary vanes integral with insert 112 are proximal to the rotor disk 111. In the position of FIGS. 5 and 7, front vane portions 12 are aligned with rear vane portions 13 which are integral with the disk body 113. Insert 112 is limitedly rotatable about axis O with reference to the disk body 113 by about half the pitch of the vanes, i.e.

from the working position of FIGS. 5 and 7 into and idling position shown in FIGS. 6 and 8. In the latter position, the front vane portions 12 are angularly offset from the rear vane portions 13 so as to form bypasses B for the circulating fluid which is thus no longer constrained to flow back and forth between the pockets of the two disks but can follow a meandering course within the split stator disk 112, 113 without exerting a significant reaction upon the unitary rotor disk 111.

As illustrated in FIGS. 5 and 6, the relative rotation of insert 112 and disk body 113 is limited by a peripheral lug 10 integral with that insert extending into a recess 21 in the disk body. Lug 10 is movable between two abutments, i.e. a shoulder 15 at one end of recess 21 and a stud 18 projecting within the recess from the opposite end thereof. A coil spring 19 on stud 18 bears upon a face 16 of lug 10 to urge its opposite face 14 into contact with shoulder 15, i.e. into the idling position of FIGS. 6 and 8. In the working position shown in FIGS. 5 and 7, lug 10 rests against stud 18 and compresses the spring 19.

Figure 1:
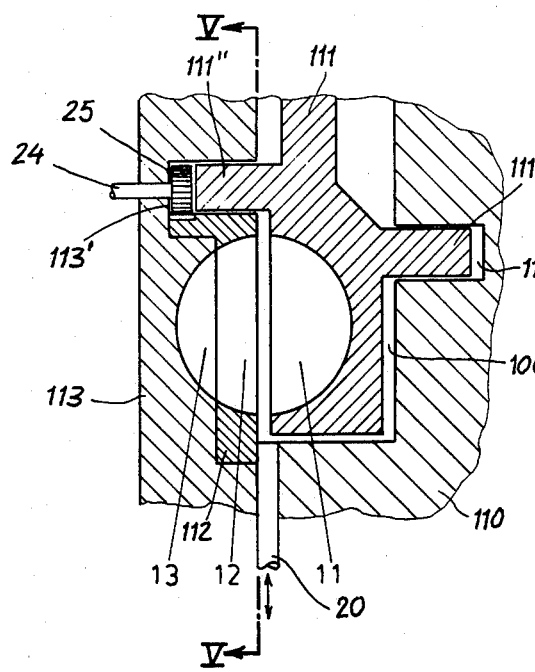
FIG. 1 is a fragmentary view, in axial section, of a hydrodynamic brake embodying my invention.

The movement of insert 112 into its working position, against the force of spring 19, could be accomplished with the aid of an external servomechanism including a shaft 24, FIG. 1, which is journaled in the disk body 113 and bears a pinion 25 meshing with a toothed portion of the inner periphery of the annular insert. Thanks to the slanting of the vanes illustrated in FIGS. 5 - 8, however, such a movement can also be brought about automatically by the pressure of the oil admitted into the chamber 100 whenever it is desired to decelerate the rotation of disk 111 and its load shaft. When the rotor disk 111 approaches standstill, the torque exerted by the circulating fluid upon the vane portions 12 in the direction of arrow A decreases to let the spring 19 return the insert 112 to its idling position. Such a restoration also takes place if, with disk 111 still rotating at high speed, the brake chamber 100 is drained. Recess 21, lug 10 and stud 18 with spring 19 may, or course, be duplicated at several locations angularly equispaced about axis O. The combined spring force should be just sufficient to overcome the residual torque exerted upon the ring 112 by the entrained air volume when the chamber 100 is substantially completely emptied of hydraulic fluid.

Figure 2:
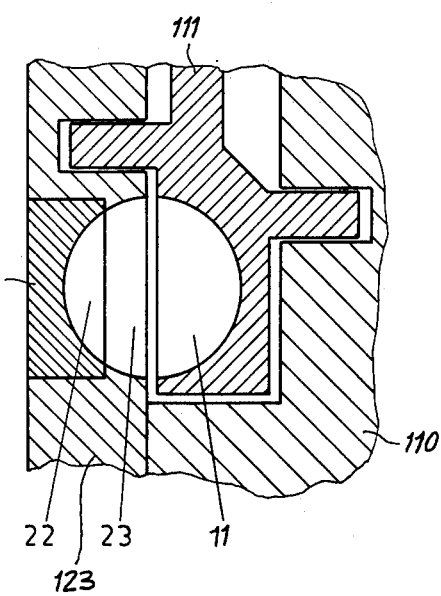
FIGS. 2 - 4 are views similar to FIG. 1, illustrating various modifications.

The system of FIG. 2 differs from that of FIG. 1 by the presence of a modified stator disk whose body 123 is integral with front portions 23 of the stationary vanes while an annular insert 122 forms the rear portions 22 of these vanes. Insert 122 is again limitedly shiftable with reference to the stator body 123 and housing 110, by means such as those described in connection with the preceding embodiment, to form a bypass path for the fluid in an idling position similar to that shown in FIGS. 6 and 8.

Figure 3:
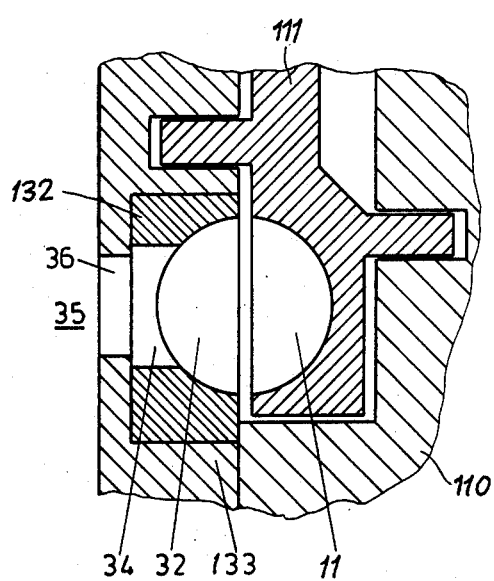
Figure 9:
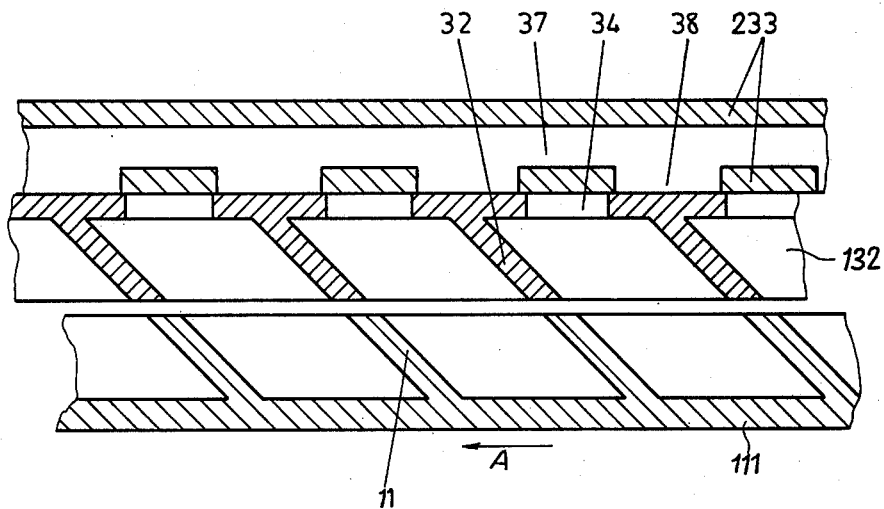
FIGS. 9 and 10 are views similar to FIGS. 7 and 8 but relating to the embodiment of FIG. 4.
Figure 10:
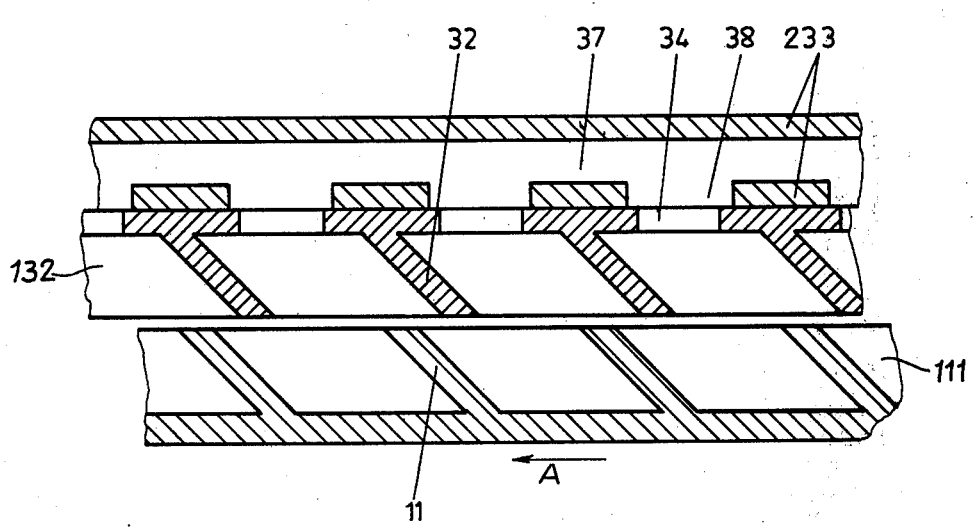

In FIG. 3 I have shown a stator disk with a body 133 and an annular insert 132 carrying vanes 32 which form the stationary pockets. These pockets have bottoms with openings 34 which in the idling position, illustrated in FIG. 3, register with respective apertures 36 in the disk body 133 opening into a surrounding air space 35. A similar construction has been shown in FIGS. 4, 9 and 10 which differs from that of FIG. 3 only in that the disk body 233 is formed with an annular channel or manifold 37 communicating with peripherally spaced apertures 38 which, like apertures 36 in FIG. 3, register with bottom openings 34 of the pockets of ring 132 in the idling position. This idling position has also been shown in FIG. 10 whereas FIG. 9 represents the working position in which the stationary pockets of insert 132 are blocked by solid portions of the disk body 233.

Figure 4:
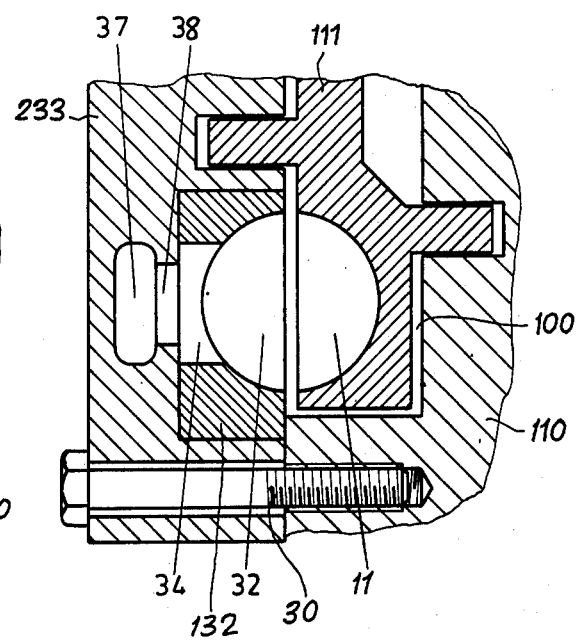

In FIG. 4 I have also shown one of several bolts 30 by which the housing 110 and the body of the stator disk are interconnected to define the chamber 100.

The limitedly displaceable vane ring 112, 122, 132 can also be used to vary the braking torque usefully exerted in the working position upon a filling of chamber 100 with hydraulic fluid, as by driving the pinion 25 of FIG. 1 to move that insert into an intermediate position against the dynamic pressure of the fluid.

The embodiments of FIGS. 1 and 2, in which the vanes are split along with the disk, have the advantage of a relatively short flowpath through the bypasses B in the idling position of FIG. 8. The embodiments of FIGS. 3 and 4 are structurally simpler by providing a unitary array of vanes.

I claim:

1. A hydrodynamic brake comprising:
   a stator disk and a rotor disk coaxially juxtaposed, said disks having confronting faces each provided with an annular groove centered on the common axis of said disks, said disks being further formed with respective sets of angularly equispaced vanes subdividing each of said grooves into a multiplicity of pockets, said sets of vanes being aligned with each other in certain relative angular positions of said disks, the vanes of one of said disks being each split into first and second segments;
   a housing rigid with said stator disk forming a toroidal chamber around said rotor disk; and
   conduit means for alternately filling said chamber with hydraulic fluid and draining said fluid therefrom, the presence of said fluid in said pockets impeding the relative rotation of said disks;
   said one of said disks being split into a body carrying said first segments and an annular insert centered on said axis, said insert carrying said second segments and being limitedly rotatable about said axis between a first and a second position relative to said body for mutually isolating the pockets of said split disk by relatively aligning said first and second segments in said first relative position and for interconnecting the last-mentioned pockets at locations remote from the other disk by relatively offsetting said first and second segments in said second relative position.

2. A brake as defined in claim 1 wherein the vanes of said split disk are pitched in the direction of the oncoming vanes of the other disk whereby a torque is exerted upon said insert through the hydraulic fluid by the relative rotation of said disks, said torque tending to displace said insert from said second to said first relative position.

3. A brake as defined in claim 2 wherein said split disk is provided with biasing means urging said insert into said second relative position with a force insufficient to resist said torque upon relative rotation of said disks while said chamber is substantially completely filled with said fluid.

4. A brake as defined in claim 3 wherein said insert and said body are provided with coacting formations limiting their relative displacement, said biasing means comprising a spring bearing upon said formations.

5. A brake as defined in claim 1 wherein said insert is interposed between said body and the other disk.

6. A brake as defined in claim 1 wherein said split disk is the stator disk.

7. A hydrodynamic brake comprising:
- a stator disk and a rotor disk coaxially juxtaposed, said disks having confronting faces each provided with an annular groove centered on the common axis of said disks, said disks being further formed with respective sets of angularly equispaced vanes subdividing each of said groves into a multiplicity of pockets, said sets of vanes being aligned with each other in certain relative angular positions of said disks;
- a housing rigid with said stator disk forming a toroidal chamber around said rotor disk; and
- 1 conduit means for alternately filling said chamber with hydraulic fluid and draining said fluid therefrom, the presence of said fluid in said pockets impeding the relative rotation of said disks;
    - one of said disks being split into a body and an annular insert centered on said axis, said insert being integral with at least a portion of each vane of said split disk and being limitedly rotatable about said axis between a first and a second position relative to said body for mutually isolating the pockets of said split disk in said first relative position and for interconnecting the last-mentioned pockets at locations remote from the other disk in said second relative position, thereby forming a bypass path for fluid impelled by the relative rotation of said disks, the vanes of said split disk being pitched in the direction of the oncoming vanes of the other disk whereby a torque is exerted upon said insert through the hydraulic fluid by the relative rotation of said disks, said torque tending to displace said insert from said second to said first relative position;
    - said split disk being provided with biasing means urging said insert into said second relative position with a force insufficient to resist said torque upon relative rotation of said disks while said chamber is substantially completely filled with said fluid, said biasing means being able to move said insert to said second relative position upon a draining of said fluid from said chamber to permit relative rotation of said disks substantially unimpeded by residual fluid in said pockets.

8. A brake as defined in claim 7 wherein said insert and said body are provided with coacting formations limiting their relative displacement, said biasing means comprising a spring bearing upon said formations.

9. A brake as defined in claim 7 wherein said insert and said body form complementary portions of the pockets of said split disk, said complementary portions being relatively offset by substantially half the angular separation of said vanes in said second relative position to provide a bypass path for fluid impelled by the relative rotation of said disks.

* * * * *